US009323596B2

(12) United States Patent
Nagumo (10) Patent No.: US 9,323,596 B2
(45) Date of Patent: Apr. 26, 2016

(54) NETWORK APPARATUS AND METHOD OF MONITORING PROCESSOR (71) Applicant: ALAXALA Networks Corporation, Kanagawa (JP)

(72) Inventor: Takashi Nagumo, Kawasaki (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 133 days.

(21) Appl. No.: 14/309,247

(22) Filed: Jun. 19, 2014

(65) Prior Publication Data

US 2015/0058682 A1 Feb. 26, 2015

(30) Foreign Application Priority Data

Aug. 26, 2013 (JP) .................................. 2013-174058

(51) Int. Cl.
G06F 11/00 (2006.01)
G06F 11/07 (2006.01)
G06F 11/30 (2006.01)

(52) U.S. Cl.
CPC .......... G06F 11/076 (2013.01); G06F 11/0724 (2013.01); *G06F 11/3024* (2013.01); *G06F 11/3055* (2013.01)

(58) Field of Classification Search
CPC .............. G06F 11/0724; G06F 11/076; G06F 11/3024; G06F 11/3055
See application file for complete search history.

(56) References Cited

U.S. PATENT DOCUMENTS

| 2002/0120741 | A1* | 8/2002 | Webb ................... G06F 11/3093 709/225 |
| 2010/0070802 | A1 | 3/2010 | Inoue et al. |
| 2013/0242756 | A1 | 9/2013 | Miyazaki et al. |
| 2013/0336104 | A1* | 12/2013 | Talla ..................... H04L 45/245 370/216 |
| 2013/0339663 | A1* | 12/2013 | Chang ................. G06F 11/0724 712/29 |
| 2014/0359350 | A1* | 12/2014 | Plank ..................... G06F 9/5027 714/10 |

FOREIGN PATENT DOCUMENTS

| JP | 2012-080426 A | 4/2012 |
| JP | 2013-115603 A | 6/2013 |
| WO | 2008/126471 A1 | 10/2008 |

OTHER PUBLICATIONS

Japanese Office Action received in corresponding Japanese Application No. 2013-174058 dated Dec. 1, 2015.

* cited by examiner

*Primary Examiner* — Joshua P Lottich
(74) *Attorney, Agent, or Firm* — Mattingly & Malur, P.C.

(57) ABSTRACT

To detect a failure in each processor core appropriately. It is provided a network apparatus for transferring a packet, comprising: a control unit; and a network processor including a plurality of processor cores, each configured to perform a process of transferring a packet input over a network. The control unit being configured to: transmit a packet to the network processor; acquire a packet processing status of each of the plurality of processor cores; and monitor a status of the each of the plurality of processor cores based on the acquired packet processing status.

9 Claims, 7 Drawing Sheets

NETWORK APPARATUS AND METHOD OF MONITORING PROCESSOR

CLAIM OF PRIORITY

The present application claims priority from Japanese patent application JP 2013-174058 filed on Aug. 26, 2013, the content of which is hereby incorporated by reference into this application.

BACKGROUND OF THE INVENTION

This invention relates to a network apparatus that transfers packets.

In recent years, there is known, in order to respond to future expansion of function, a network apparatus (router, switch) in which a network processor using a multi-core processor having a plurality of processor cores is installed. In particular, a packet transfer part that directly deals with user packets may use a multi-core network processor having an Ethernet interface or the like, an encryption capability, and a hardware-based L2 parser in addition to the capabilities of a general-purpose processor.

There is also known a network processor that uses a hardware logic alone to configure a packet scheduler which assigns input packets to the individual processor cores in order to ensure the wire speed, and determines the assignment of the packets to the individual processor cores based on the idling statuses of resources.

Japanese Patent Application Laid-open No. JP 2012-80426 A is the related art of the technical field of this invention. Japanese Patent Application Laid-open No. JP 2012-80426 A describes a communication apparatus including a control part and a processing part. The control part includes a monitoring packet transmission part that transmits a monitoring packet to the processing part, a monitoring packet response reception part that receives a response to the monitoring packet, and a failure detection part that detects a failure occurring in the processing part when the monitoring packet response reception part detects a response error of the monitoring packet and when the number of the response errors detected during a monitoring period is equal to or larger than a threshold value. The processing part includes a monitoring packet response part that returns a response to the control part.

SUMMARY OF THE INVENTION

In the above-mentioned network processor, a health check technology for detecting a silent failure in a processor core is important. The health check needs to consider a case where there is no user traffic.

The technology described in Japanese Patent Application Laid-open No. JP 2012-80426 A assigns packets to the processor cores in a round robin mode. Accordingly, a processor core which is subject to health check cannot be specified, and some processor cores may not be subject to health check. In addition, a failure in a processor core is detected by checking whether or not a health-check packet is returned, and hence when there is a mixture of a health-check packet and a user packet, a failure in a certain processor core may not be detected.

Because the packet scheduler is generally configured by a hardware logic and is not programmable, it is difficult to implement a function of assigning a health-check packet to a desired processor core. This requires a method of assigning the health-check packet to every processor core without depending on the packet scheduler.

As apparent from the above, the related art has a difficulty in reliably performing alive monitoring on all the processor cores. Demands have therefore been made on a simple health checking method capable of reliably detecting a failure in every processor core.

The representative one of inventions disclosed in this application is outlined as follows. There is provided a network apparatus for transferring a packet, comprising: a control unit; and a network processor including a plurality of processor cores, each configured to perform a process of transferring a packet input over a network. The control unit being configured to: transmit a packet to the network processor; acquire a packet processing status of each of the plurality of processor cores; and monitor a status of the each of the plurality of processor cores based on the acquired packet processing status.

According to an exemplary embodiment of this invention, a failure in each processor core can be appropriately detected. Objects, configurations, and effects other than those described above are readily apparent from the following description of embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Figure 1:
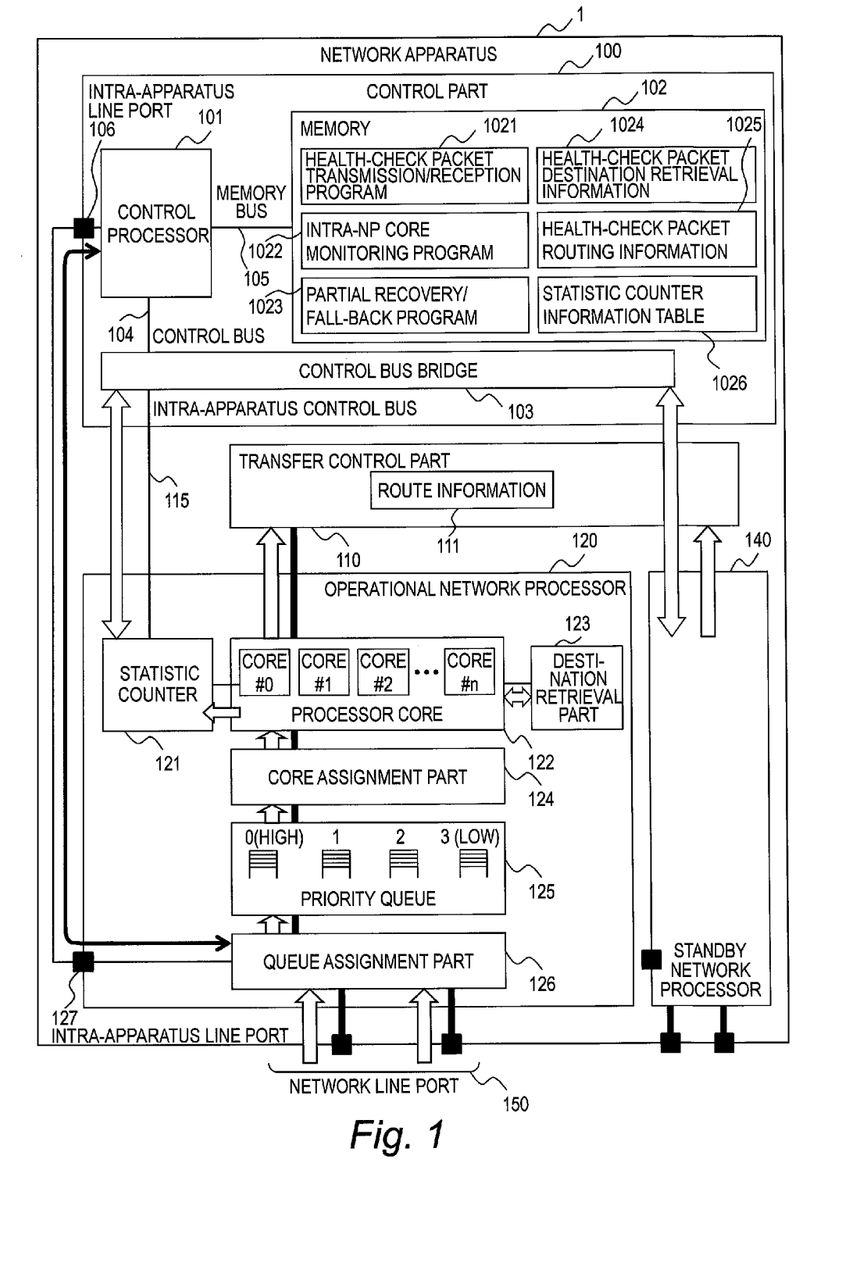
FIG. 1 is a block diagram illustrating a configuration of a network apparatus according to a first embodiment of this invention.

FIG. 1 is a block diagram illustrating a configuration of a network apparatus according to a first embodiment of this invention.

A network apparatus 1 according to the first embodiment includes a control part 100, a transfer control part 110, network processors 120 and 140, and a network line port 150.

The control part 100 includes a control processor 101, a memory 102, a control bus bridge 103, a control bus 104, a memory bus 105, and an intra-apparatus line port 106.

The control processor 101 executes a program stored in the memory 102 to control the operation of the network apparatus 1.

The memory 102 is connected to the control processor 101 through the memory bus 105. The memory 102 stores a program that is executed by the control processor 101, and data that is used when the program is executed. For example, the memory 102 stores a health-check packet transmission/reception program 1021, an intra-NP core monitoring program 1022, and a partial recovery/fall-back program 1023. The memory 102 also stores health-check packet destination retrieval information 1024, health-check packet routing information 1025, and a statistic counter information table 1026.

The memory 102 may be configured by a volatile storage apparatus (e.g., DRAM) or a non-volatile storage apparatus (e.g., flash memory). In other words, the program that is executed by the control processor 101 is read out from an internal or external non-volatile storage apparatus (flash memory, magnetic storage apparatus, or the like) of the memory 102, and is loaded into a volatile storage apparatus to be executed by the control processor 101.

The program that is executed by the control processor 101 is provided over a network or by a removable medium (flash memory, CD-ROM, or the like), and is stored in the memory 102 which is a non-transitory memory medium. Accordingly, it is preferred that the network apparatus 1 have an interface to read a removable medium (e.g., USB port).

By the control processor 101 executing a predetermined program, the functions of the control part 100 are implemented. The control part 100 may be configured by a dedicated logic-circuit based LSI.

The health-check packet transmission/reception program 1021 generates a health-check packet for performing alive monitoring of a processor core 122, and transmits the generated health-check packet to the network processor 120 at a predetermined time interval (T). The health-check packet transmission/reception program 1021 also receives a health-check packet returned from the network processor 120, and collates the received health-check packet with the transmitted health-check packet.

The intra-NP core monitoring program 1022 monitors the operational status of the processor core 122. Accordingly, the intra-NP core monitoring program 1022 acquires a count value (e.g., the number of packets processed for each processor core) from a statistic counter 121. Alternatively, the intra-NP core monitoring program 1022 collates the returns of the health-check packets transmitted by the health-check packet transmission/reception program 1021. The intra-NP core monitoring program 1022 may monitor all the processor cores #0 to #n by using a single program, or may monitor the individual processor cores by a plurality of threads that operate for the respective programs. The details of a failure detection/determination process that is executed by the intra-NP core monitoring program 1022 are given later referring to FIG. 5.

The partial recovery/fall-back program 1023 recovers or stops a processor core in accordance with the level of a failure in case where the failure in the processor core is detected.

The health-check packet destination retrieval information 1024 stores information on a processor core (e.g., identification information on a processor core) that is subject to alive monitoring based on the health-check packet.

The health-check packet routing information 1025 stores the destination of a processor core (e.g., identification information of a processor core, the number of an intra-apparatus line port) that is subject to alive monitoring based on the health-check packet.

The statistic counter information table 1026 stores a count value (e.g., the number of packets processed for each processor core) read from the statistic counter 121. According to the first embodiment, the statistic counter information table 1026 stores a one-cycle old count value to compare count values of the statistic counter 121 at predetermined time intervals (T).

The control bus bridge 103 connects the control bus 104 in the control part 100 to a control bus 115 in the network apparatus 1. The intra-apparatus control bus 115 is connected to the network processors 120 and 140. The control part 100 acquires a count value from the statistic counter 121 through the intra-apparatus control bus 115.

The intra-apparatus line port 106 is connected to other circuits (e.g., network processor 120). The control part 100 transmits and receives a health-check packet through the intra-apparatus line port 106.

The transfer control part 110 determines the transfer destination of a packet input to the network apparatus 1, and has route information 111. The route information 111 is used to determine a port for outputting the input packet, and includes information on an output port for transferring the health-check packet.

A plurality of network processors are implemented. Although FIG. 1 illustrates two network processors, namely the operational network processor 120 and the standby network processor 140, more than two network processors may be implemented.

Because the individual network processors have the same configuration, the configuration and functions of the operational network processor 120 are described hereinafter, and the description of the standby network processor 140 is omitted.

The network processor 120 includes the statistic counter 121, the processor core 122, a destination retrieval part 123, a core assignment part 124, a priority queue 125, a queue assignment part 126, and an intra-apparatus line port 127.

The statistic counter 121 counts statistic information relating to the network apparatus 1. For example, the statistic counter 121 counts the number of packets processed for each processor core and the number of health-check packets processed for each processor core. When receiving a packet to be processed, each of the processor cores #0 to #n requests the statistic counter 121 to increment a value at a predetermined address assigned to the statistic counter 121.

The processor core 122 includes a plurality of processor cores #0 to #n. By the individual processor cores #0 to #n executing the program stored in the memory (not shown), the functions of the network processor 120 are implemented. The program that is executed by the processor core 122 is provided over a network or by a removable medium (flash memory, CD-ROM, or the like), and is stored in the memory which is a non-transitory memory medium.

The destination retrieval part 123 retrieves the destination of a packet input to the processor core 122 by referring to the health-check packet destination retrieval information 1024 and the health-check packet routing information 1025, and determines the output destination port for the input packet.

Specifically, in case where the input packet is determined as a health-check packet, the destination retrieval part 123 determines based on the destination address whether the health-check packet is addressed to the local apparatus or another apparatus, and determines the output destination port.

The queue assignment part 126 determines the priorities of packets input to the network line port 150 and the intra-apparatus line port 127 in accordance with a predetermined rule, and assigns the packets to queues respectively provided for the determined priorities. For example, the queue assignment part 126 determines a health-check packet in accordance with an Ether type affixed to the input packet, and assigns the health-check packet to a predetermined queue (e.g., lowest priority queue in the case of the first embodiment, or highest priority queue in the case of a second embodiment of this invention).

The queue assignment part 126 also determines the priorities of user packets input to the network line port 150 and the intra-apparatus line port 127 in accordance with a predetermined rule, and assigns the packets to queues respectively provided for the determined priorities. For example, the queue assignment part 126 determines the priorities of input user packets in accordance with a predetermined rule, and assigns the user packets to queues respectively provided for the determined priorities.

The priority queue 125 has queues having a plurality of priorities. Many packets are acquired from a queue having a high priority in a unit time, and fewer packets are acquired from a queue having a low priority in a unit time.

The core assignment part 124 assigns packets stored in the priority queue 125 to the respective processor cores #0 to #n. In particular, the core assignment part 124 assigns health-check packets to all the processor cores. For example, the core assignment part 124 assigns packets in accordance with the assignment rules such as the round robin mode, the loads on the processor cores, the types of the packets, and information inside the packets.

The intra-apparatus line port 127 is connected to other circuits (e.g., control part 100), which transmit and receive a health-check packet through the intra-apparatus line port 127.

It should be noted that the destination retrieval part 123, the priority queue 125, the queue assignment part 126, and the intra-apparatus line port 127 are essential in the second embodiment to be described later, not in the first embodiment.

The network line port 150 is an interface through which a packet is input to, and output from, the network apparatus 1. The network line port 150 transmits and receives a user packet transferred from another apparatus and a health-check packet to be transferred between network apparatus.

Figure 2:
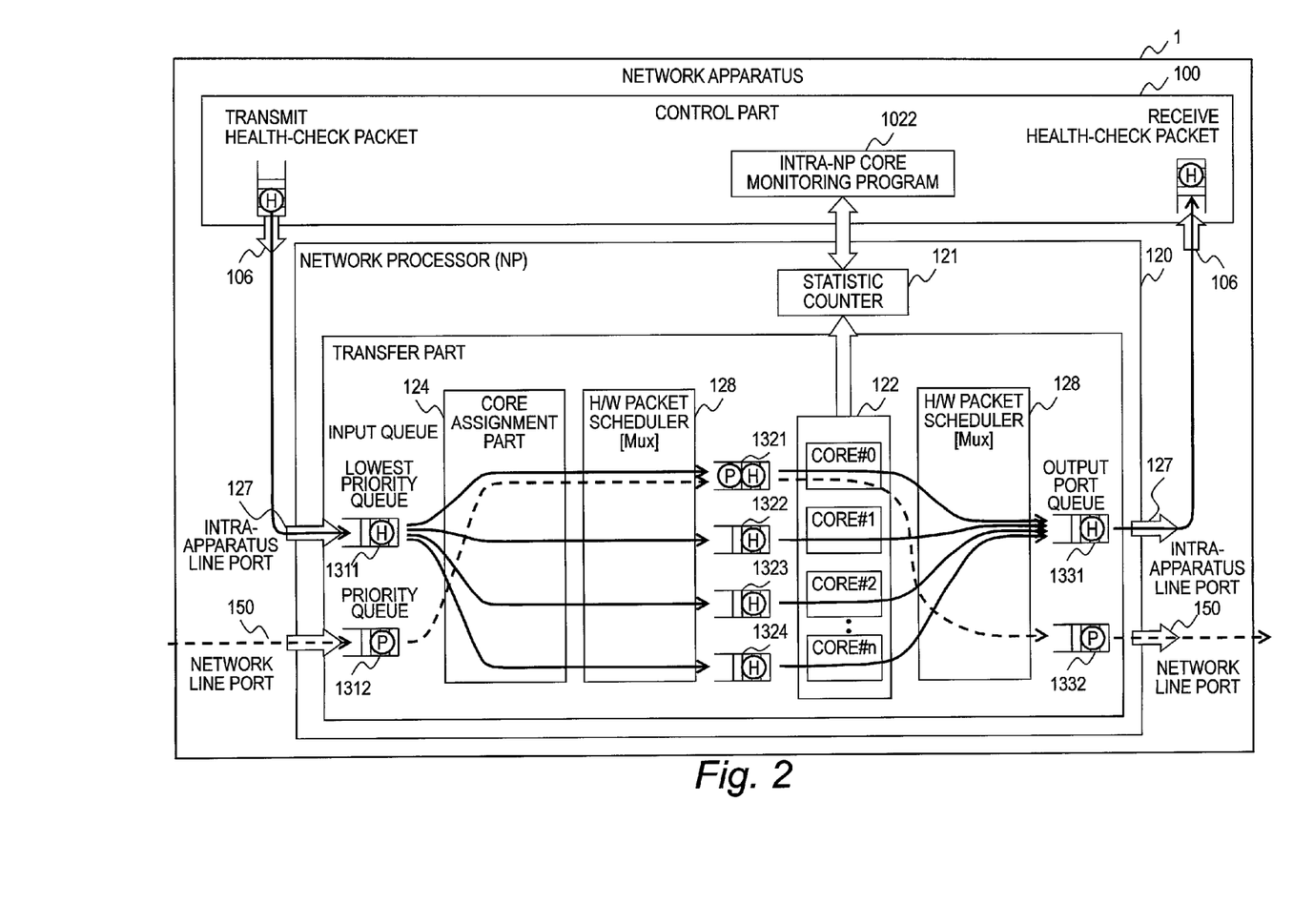
FIG. 2 is a diagram illustrating a process for a health-check packet according to the first embodiment.

FIG. 2 is a diagram illustrating a process for a health-check packet according to the first embodiment.

The health-check packet transmission/reception program 1021 in the control part 100 transmits a health-check packet to the processor core 122 at a predetermined time interval (T). In FIG. 2, a health-check packet is represented by a symbol "H", and a user packet is represented by a symbol "P". Each health-check packet to be returned by the processor core 122 to the control part 100 has an intra-apparatus transfer destination specified as the network processor 120 and an intra-apparatus transmission source specified as the control part 100.

The health-check packet transmitted by the health-check packet transmission/reception program 1021 is input to a lowest priority queue 1311 of the input queue through the intra-apparatus line ports 106 and 127. This input is made to process the health-check packet with low priority so that the health-check packet does not cause an influence such as delay on the transfer of user data. A transfer part is implemented by the program that is executed by the network processor 120, and determines the transfer destination of the packet in the network apparatus 1.

According to the first embodiment, unlike the second embodiment to be described later, the health-check packet is input from the intra-apparatus line port 127. Therefore, it is possible to easily identify the health-check packet and a user packet which is input from the network line port 150. Accordingly, according to the first embodiment, the health-check packet only needs to specify the intra-apparatus transfer destination and transmission source as the control part 100 or the network processor 120, thus eliminating the need for use of a special health-check packet including another piece of information for identifying a health-check packet.

After a predetermined number (e.g., identical to the number of the cores) of health-check packets are stored in the lowest priority queue 1311, the core assignment part 124 performs burst transmission of the health-check packets to an H/W packet scheduler 128.

The H/W packet scheduler 128 transmits the health-check packets transmitted from the core assignment part 124 to the respective processor cores #0 to #n. The program that runs on the processor core 122 may create the same state in which burst transmission of the health-check packets to the processor core 122 is performed.

In case where the received packet is a health-check packet, each of the processor cores #0 to #n returns the health-check packet to the control part 100. The details of the process executed by the processor core are described later referring to FIG. 4. Each of the processor cores #0 to #n transmits the health-check packet to be returned to the control part 100 to the H/W packet scheduler 128, thereby returning the health-check packet to the control part 100.

In order to determine the output destination port for the health-check packet, the processor core 122 refers to the destination address, but does not change the destination address or the transmission source address. At the time of returning a health-check packet transmitted from another apparatus, the destination address and the transmission source address need to be reversed, which is not needed in the first embodiment. (Switching of the addresses is carried out by the control part 100.)

The H/W packet scheduler 128 stores the health-check packet transmitted from the processor core 122 in an output port queue 1331 corresponding to the intra-apparatus line port 127. The health-check packet stored in the output port queue 1331 is transmitted to the control part 100 through the intra-apparatus line ports 127 and 106.

According to the first embodiment, the statistic counter 121 counts the number of packets processed for each processor core. The intra-NP core monitoring program 1022 acquires the number of packets processed for each processor core from the statistic counter 121 at health-check packet transmission periods (T). Then, the intra-NP core monitoring program 1022 determines whether each processor core is operating or a failure has occurred therein based on the acquired number of processed packets. In other words, the intra-NP core monitoring program 1022 monitors a failure in the processor core based on an increase in the count value of the statistic counter 121 within a predetermined time period (determines that a processor core whose number of processed packets has not increased within a predetermined time period has a failure). The details of the failure detection/determination process are given later referring to FIG. 5.

It should be noted that the intra-NP core monitoring program 1022 may detect a failure in each processor core by using the number of processed packets acquired from the statistic counter 121 and the health-check packet returned from each processor core. According to the first embodiment, the determination using the statistic counter 121 can determine a failure at higher precision than the determination using the returned health-check packet. This is because the network apparatus 1 may come to an over-subscription state and the health-check packet may not be assigned to some processor cores.

In case where the intra-NP core monitoring program 1022 is configured to detect a failure in the processor core 122 by using the number of processed packets acquired from the statistic counter 121, the processor core 122 may not return the health-check packet to the control part 100 as long as the processor core 122 updates the statistic counter 121.

Next, a modification of the method of assigning a health-check packet to the respective processor cores #0 to #n is described. According to the modification described below, health-check packets are not transmitted to the respective processor cores after a predetermined number of health-check packets are stored in the lowest priority queue 1311, but health-check packets are transmitted to all the processor cores by delaying the process for the health-check packet in each processor core.

Specifically, in case where a processor core is processing a packet, the H/W packet scheduler 128 does not transmit a new packet to the processor core. Accordingly, a health-check packet is transmitted to a processor core which is not busy by extending the processing time for a health-check packet within each processor core by n times (n: the number of processor cores), and thus the health-check packets can be transmitted to all the processor cores.

It should be noted that, according to the modification, a special queue (e.g., pending queue) for transmitting a health-check packet to the processor core which is not busy may be provided. Separating a queue for a health-check packet from a queue for a user packet allows the health-check packet and the user packet to be transmitted to the processor core at different timings.

According to the modification, with no user packet input, health-check packets are assigned to all the processor cores. With a user packet input, on the other hand, any one of the user packet and the health-check packet is input to each processor core. The network apparatus 1 may come to an over-subscription state when all the processor cores are processing health-check packets.

In case of receiving a user packet, each processor core may stop processing a health-check packet, and discard the health-check packet which is being processed. This is because the health check according to this embodiment is to check if a processor core is operating, and a processor core operates even when the health-check packet is not processed normally as long as a user packet is processed. In other words, when the time for inputting health-check packets for all the processor cores is shorter than the time for a processor core to process a packet, the packets can be assigned to all the processor cores.

In case where the control part 100 performs alive monitoring of each processor core based on the count value of the statistic counter 121, each processor core may stop processing the health-check packet (or may not process the health-check packet), and may discard the health-check packet which is being processed. The discarding of the health-check packet prevents the consumption of the resources of the processor core for processing the health-check packet.

Figure 3:
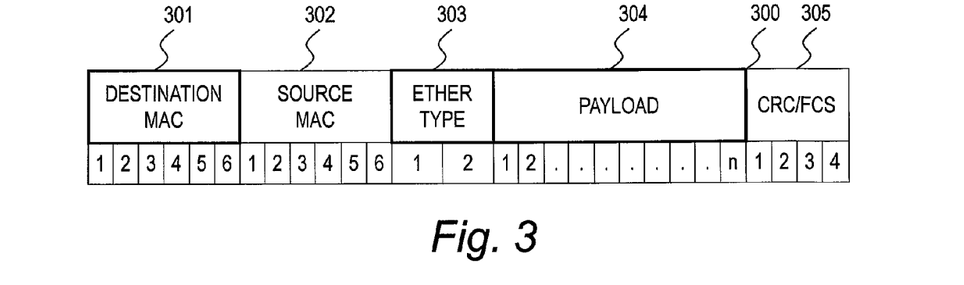
FIG. 3 is a diagram illustrating the frame format of a health-check packet according to the first embodiment.

FIG. 3 is a diagram illustrating the frame format of a health-check packet according to the first embodiment.

A health-check packet is transmitted and received between the control part 100 and the processor core 122 in the network apparatus 1. The health-check packet includes a destination address 301, a transmission source address 302, an Ether type 303, a payload 304, and an error correcting code 305.

The destination address 301 and the transmission source address 302 specify the apparatus to which a health-check packet is addressed and the apparatus that has transmitted the health-check packet, respectively, and in this embodiment, specify the control part 100 and each processor core 122, respectively. The network processor 120 determines a port for outputting a packet by using the destination MAC address.

The Ether type 303 is a field which is used to identify an upper layer protocol. According to the second embodiment, the Ether type 303 is used to store a code for identifying a health-check packet. For example, a number (e.g., 0x9999) other than the one defined by IEEE 802 may be used to identify a health-check packet. Alternatively, an IP address or VLAN-ID exclusively determined for a health-check packet may be used without using the Ether type to identify a health-check packet.

The payload 304 generally stores user data, but a health-check packet according to the second embodiment stores the number of a processor core subject to health check at a predetermined position (e.g., the top four bytes) in the payload.

Figure 4:
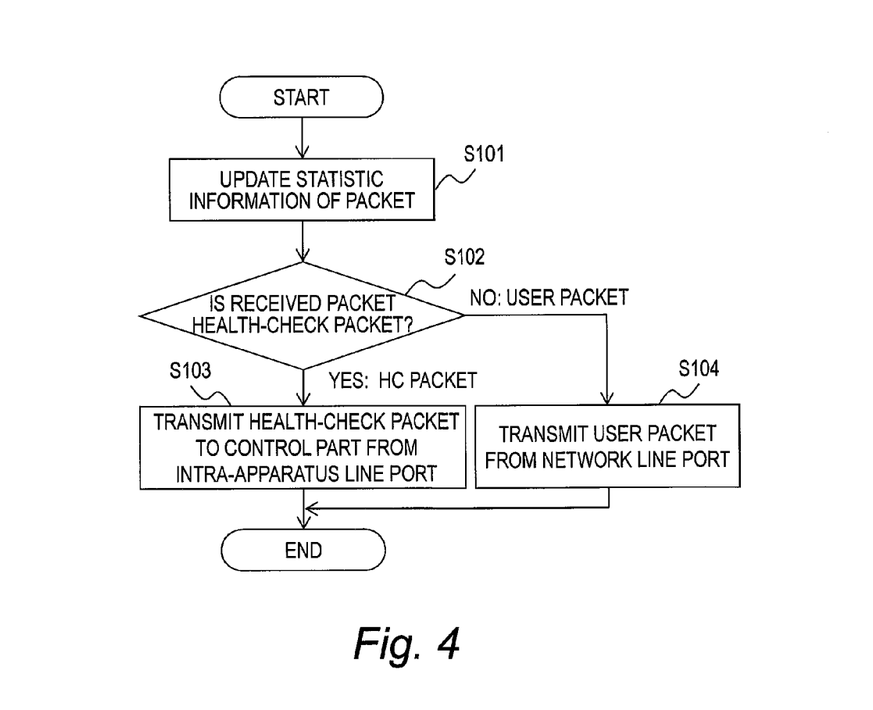
FIG. 4 is a flowchart of process for a health-check packet executed in the network processor according to the first embodiment.

FIG. 4 is a flowchart of process for a health-check packet executed in the network processor 120 according to the first embodiment.

In case of receiving packets, the processor core 122 updates statistic information (count value) stored in the statistic counter 121 (Step S101). Specifically, the number of packets processed for each processor core (sum of the number of health-check packets and the number of user packets) is updated.

It should be noted that the processor core 122 may not update the statistic counter 121 when receiving a packet, but may update the statistic counter 121 when completing processing of a packet. Alternatively, the processor core 122 may update the statistic counter 121 when the received (processed) packet is a health-check packet.

Next, the processor core 122 determines whether or not the received packet is a health-check packet (Step S102). In case where the received packet is a health-check packet, the processor core 122 transmits the health-check packet from the intra-apparatus line port 127 (Step S103).

In case where the received packet is not a health-check packet (in case where the received packet is a user packet), on the other hand, the processor core 122 transmits the user packet from the network line port 150 corresponding to the destination of the user packet (Step S104).

In this way, even when there is no user packet to be processed, the processor core 122 processes the health-check packet to be transmitted at a predetermined time interval.

Figure 5:
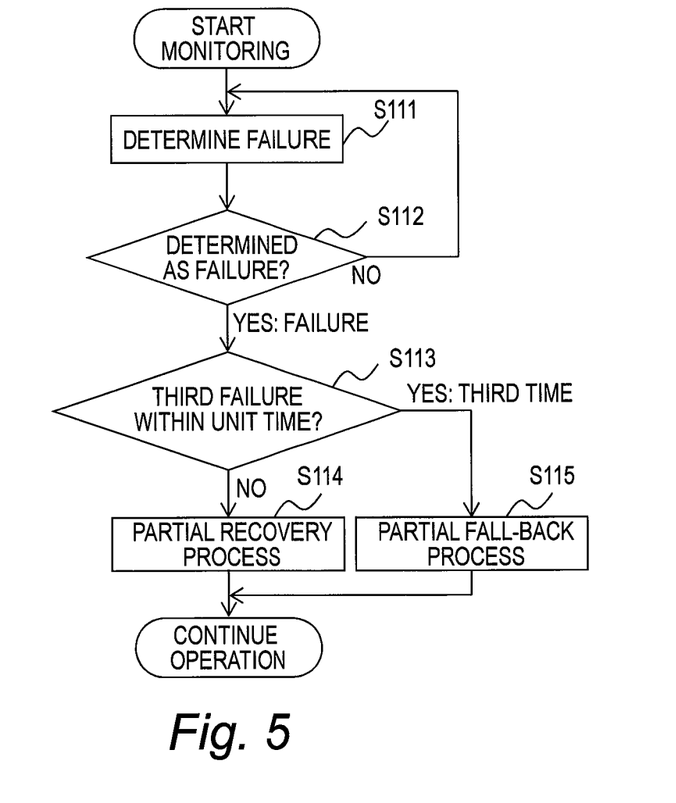
FIG. 5 is a flowchart of the failure detection/determination process of the processor core according to the first embodiment.

FIG. 5 is a flowchart of the failure detection/determination process of the processor core according to the first embodiment. The failure detection/determination process is executed by the control processor 101 in the control part 100.

The control processor 101 executes the health-check packet transmission/reception program 1021 to transmit a health-check packet to each processor core in the processor core 122 at a predetermined time interval (T). Then, the intra-NP core monitoring program 1022 determines a failure in each processor core (Step S111). Specifically, the intra-NP core monitoring program 1022 acquires the count value of the number of received packets from the statistic counter 121 at a predetermined time interval, and compares the count value with the count value stored in the statistic counter information table 1026 to determine whether or not the number of packets varies (Step S112). In case where the number of packets increases from the number of packets acquired previously, the intra-NP core monitoring program 1022 determines that the target processor core is operating, and returns to Step S111. In case where the number of packets does not increase from the number of packets acquired previously, the intra-NP core monitoring program 1022 determines that there is a failure, and proceeds to Step S113.

In Step S113, the intra-NP core monitoring program 1022 determines whether or not the number of packets processed by this processor core has increased three times consecutively. In case where the number of packets has not increased three times consecutively, the intra-NP core monitoring program 1022 proceeds to Step S115 and activates the partial recovery/fall-back program 1023 to execute a partial fall-back process. In case where the number of packets received by this processor core has not increased consecutively less than three times, on the other hand, the intra-NP core monitoring program 1022 proceeds to Step S114 and activates the partial recovery/fall-back program 1023 to execute a partial recovery process.

In the partial recovery process (Step S114), a processor core whose failure is detected is removed from the targets to which the core assignment part 124 assigns packets so that this processor core is shut off. After that, the control part 100 resets the processor core for initialization, and reloads the program to resume the operation of this processor core. Then, this processor core is returned to the targets to which the core assignment part 124 assigns packets so that this processor core is implemented. In this manner, the partial recovery process allows a processor core whose failure is detected to be reactivated.

In the partial fall-back process (Step S115), a processor core whose failure is detected is removed from the targets to which the core assignment part 124 assigns packets so that this processor core is shut off. After that, the control part 100 resets the processor core to stop the operation thereof. A threshold value for stopping the operation of the network apparatus 1 depending on the number of processor cores whose operations are stopped by the partial fall-back process may be provided. In other words, the control part 100 stops the operation of the network apparatus 1 in case where the partial fall-back process causes a processor core to stop its operation and the processing performance of the network apparatus 1 reduces accordingly.

Specifically, in case where the value of the packet counter of a processor core has not increased three times consecutively (the value of the packet counter has not increased within a predetermined time period (4T)), the control part 100 determines that there is a failure in the processor core, and stops the processor core. In case where the value of the packet counter increases at least once within the predetermined time period (4T), on the other hand, the control part 100 determines that the processor core is normal, and reactivates the processor core.

According to the first embodiment of this invention, as described above, packets (user packets or health-check packets) are assigned to all the processor cores, and the packet processing status of each processor core is monitored, and hence alive monitoring of every processor core can be performed appropriately and quickly. This enables quick execution of the partial fall-back process and the partial recovery process, thus improving the availability of the network apparatus.

In addition, the network processor 120 stores a health-check packet transmitted from the control part 100 in a predetermined queue, thus allowing a health-check packet and a user packet to be processed in accordance with different rules.

In particular, the network processor 120 stores a health-check packet in the lowest priority queue 1311 and performs burst transmission to each processor core, and hence the health-check packet can be assigned to every processor core reliably.

The control part 100 performs alive monitoring of each processor core based on statistic information on the number of health-check packets processed for each processor core, and hence even when health-check packets are not assigned to some processor cores, failures in the processor cores can be determined appropriately.

The network processor 120 updates the statistic information on the received health-check packets, and discards the received health-check packets. Accordingly, the consumption of the resources of the processor cores to process the health-check packets can be suppressed to suppress a delay in the processing of a user packet.

Second Embodiment

The second embodiment of this invention is described below.

According to the second embodiment, unlike the above-mentioned first embodiment, the control part 100 determines a processor core that is to process a health-check packet, and determines a failure in a processor core depending on whether or not a health-check packet is returned from the processor core.

Figure 8:
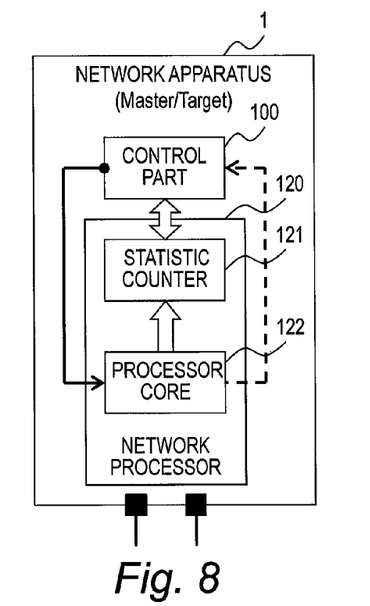
FIG. 8 is a diagram illustrating the health check of the network apparatus according to the second embodiment.

It should be noted that, although the second embodiment can be applied to alive monitoring of a processor core in a single network apparatus as illustrated in FIG. 8, the second embodiment may be applied to a case where a single network apparatus performs alive monitoring of the processor cores of a plurality of network apparatus.

Figure 6:
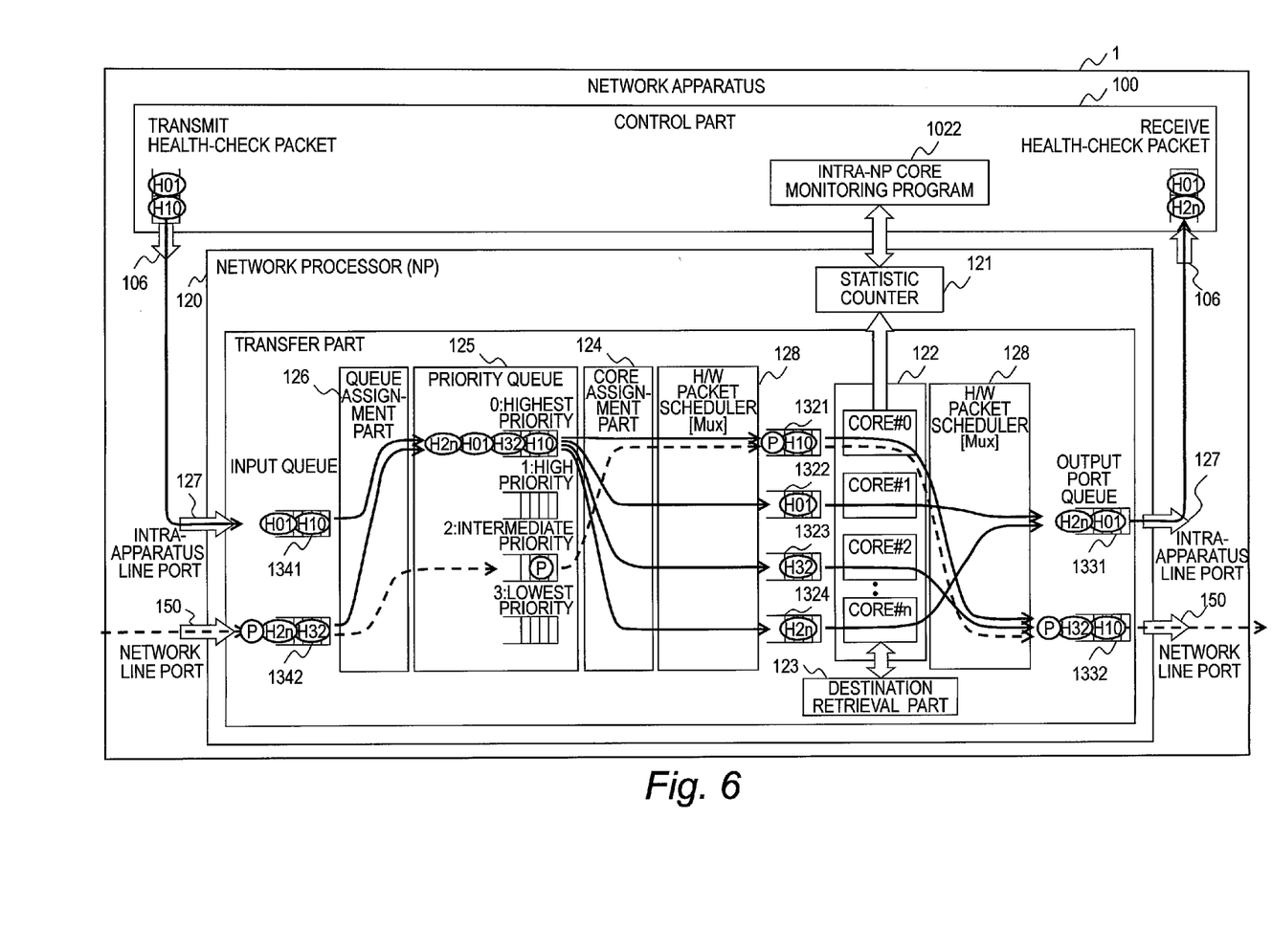
FIG. 6 is a diagram illustrating a process for a health-check packet according to a second embodiment of this invention.

FIG. 6 is a diagram illustrating a process for a health-check packet according to the second embodiment.

The health-check packet transmission/reception program 1021 in the control part 100 transmits a health-check packet to the processor core 122 at a predetermined time interval (T). According to the second embodiment, as described above, the health-check packet transmission/reception program 1021 determines a processor core that is to process a health-check packet, and the type of the health-check packet and the number of the processor core that is to process the health-check packet are included in the health-check packet.

According to the second embodiment, unlike the above-mentioned first embodiment, a health-check packet is input from the intra-apparatus line port 127 and the network line port 150. Accordingly, a user packet and a health-check packet cannot be identified based on the ports from which the packets are input. Therefore, identification information for identifying a health-check packet is added.

For example, in FIG. 6, a health-check packet is represented by a symbol "H", and a user packet is represented by a symbol "P". The first digit of the numeral of a health-check packet represents the type of the health-check packet, and the second digit of the numeral represents the number of a processor core that is to process a health-check packet.

For example, the following four types are set for the type of a health-check packet according to the second embodiment.
Type 0: transmitted from this apparatus—addressed to this apparatus (this network apparatus is Master and Target)
Type 1: transmitted from this apparatus—addressed to another apparatus (this network apparatus is Master)
Type 2: transmitted from another apparatus—addressed to this apparatus (this network apparatus is Target)
Type 3: transmitted from another apparatus—addressed to another apparatus (this network apparatus is Transit)

The above-mentioned type is not defined by a special field provided in the frame format of a health-check packet, but relatively varies in the process of transferring a health-check packet to each network apparatus.

It should be noted that the following are the relations between the destination address and the transmission source address.

For type 0, the destination is the address of the local apparatus, and the transmission source is the address of the local apparatus For type 1, the destination is the address of another apparatus, and the transmission source is the address of the local apparatus For type 2, the destination is the address of the local apparatus, and the transmission source is the address of another apparatus For type 3, the destination is the address of another apparatus, and the transmission source is the address of another apparatus (different from the address of the destination)

A health-check packet transmitted by the health-check packet transmission/reception program 1021 is input to an input queue 1341 of the transfer part through the intra-apparatus line ports 106 and 127. According to the second embodiment, a health-check packet transmitted by another network apparatus is input to an input queue 1342 of the transfer part through the network line port 150.

The queue assignment part 126 reads the Ether type 303 of the packet stored in the input queue 1341, 1342 to determine whether or not the packet stored in the input queue 1341, 1342 is a health-check packet. In case where the packet stored in the input queue 1341, 1342 is a health-check packet, the queue assignment part 126 stores the health-check packet stored in the input queue 1341, 1342 in a highest priority queue in the priority queue 125. This processing is performed to avoid discarding of the health-check packet, which is determined as a failure. When the processor core processes the health-check packet by priority, the processing of a user packet may be delayed. In this respect, the priority queue 125 may have a shaping function for each processor core so that a packet with a rate higher than a predetermined rate is controlled not to be input to the processor core. In this case, a rate which does not delay the processing of a health-check packet and does not result in the determination of a failure occurring in the processor core may be set.

It should be noted that, according to the second embodiment, as in the above-mentioned first embodiment, a health-check packet may be stored in the lowest priority queue, and alive monitoring of the processor cores may be performed based on statistic information for each processor core.

The core assignment part 124 reads a packet stored in the priority queue 125 in accordance with the priority of each queue, and transmits the packet to the H/W packet scheduler 128.

The H/W packet scheduler 128 reads the number of a processor core that is subject to health check from the payload 304 of the health-check packet transmitted from the core assignment part 124 to identify the processor core that is to process the health-check packet, and transmits the health-check packet to the identified processor core.

The destination retrieval part 123 retrieves the destination of the health-check packet received by the processor core 122.

Each of the processor cores #0 to #n determines, based on the packet type, the type of the packet, namely, the destination of the health-check packet, and returns the health-check packet to the control part 100 from the intra-apparatus line port 127 in case where the received health-check packet is addressed to the local apparatus. The control part 100 determines based on the transmission address of the received health-check packet whether the health-check packet is transmitted from the local apparatus or from another apparatus. In case where the health-check packet is transmitted from another apparatus, the control part 100 reverses the destination address and the transmission source address to generate a health-check packet which is returned to another packet transfer apparatus. In case where the health-check packet is transmitted from the local apparatus, the control part 100 need not generate a health-check packet to be returned.

In case where the health-check packet is addressed to another apparatus, the control part 100 transfers the health-check packet thereto. The details of the process executed by the processor core are described later referring to FIG. 7. Each of the processor cores #0 to #n transmits the received health-check packet to the H/W packet scheduler 128.

The H/W packet scheduler 128 stores the health-check packet transmitted from the processor core 122 in the output port queue 1331 corresponding to the intra-apparatus line port 127 or an output port queue 1332 corresponding to the network line port 150 in accordance with the destination.

The health-check packet stored in the output port queue 1331 is transmitted to the control part 100 through the intra-apparatus line ports 127 and 106. The health-check packet stored in the output port queue 1332 is transmitted to another network apparatus from the network line port 150.

The intra-NP core monitoring program 1022 checks whether or not a health-check packet is returned from each processor core to detect a failure in the processor core. In other words, the intra-NP core monitoring program 1022 determines that a processor core that does not return a health-check packet has a failure.

It should be noted that the intra-NP core monitoring program 1022 may detect a failure in a processor core by using the health-check packet returned from each processor core and the number of processed health-check packets acquired from the statistic counter 121. In this case, the statistic counter 121 counts the number of health-check packets processed for each processor core. The intra-NP core monitoring program 1022 acquires the number of health-check packets processed for each processor core from the statistic counter 121 at a health-check packet transmission period (T). Then, the intra-NP core monitoring program 1022 determines whether each processor core is operating or a failure has occurred therein based on the acquired number of processed health-check packets. In other words, the intra-NP core monitoring program 1022 monitors a failure in a processor core 122 based on an increase in the statistic counter 121 within a predetermined time period (determines that a processor core whose number of processed packets has not increased within a predetermined time period has a failure).

Figure 9:
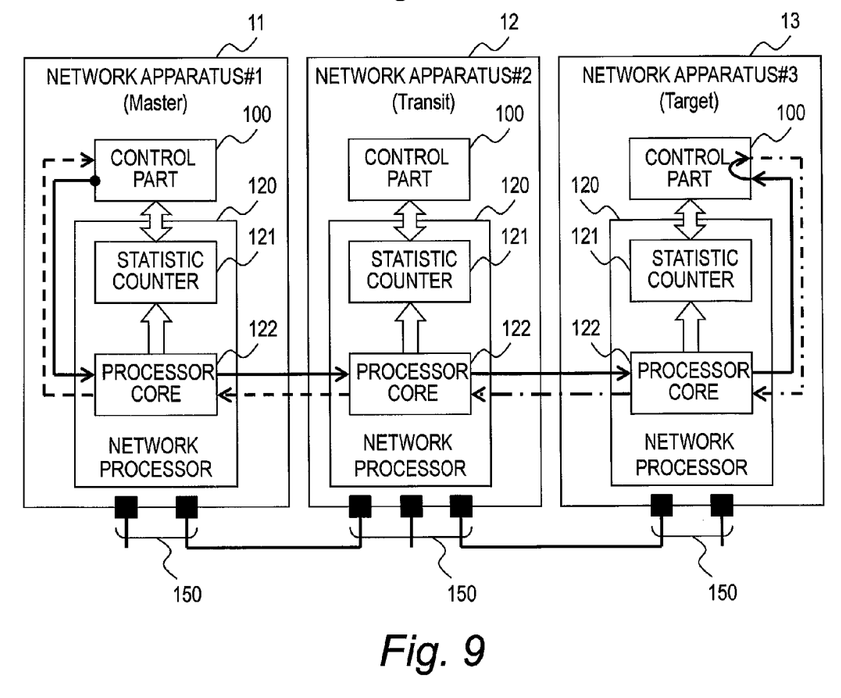
FIG. 9 is a diagram illustrating the health check in a network including the network apparatus according to the second embodiment.

For example, in case where alive monitoring of the processor cores of another network apparatus is performed over a network as illustrated in FIG. 9, the another network apparatus and the network can be monitored simultaneously by using the health-check packet returned from each processor core and the number of processed health-check packets acquired from the statistic counter 121.

Figure 7:
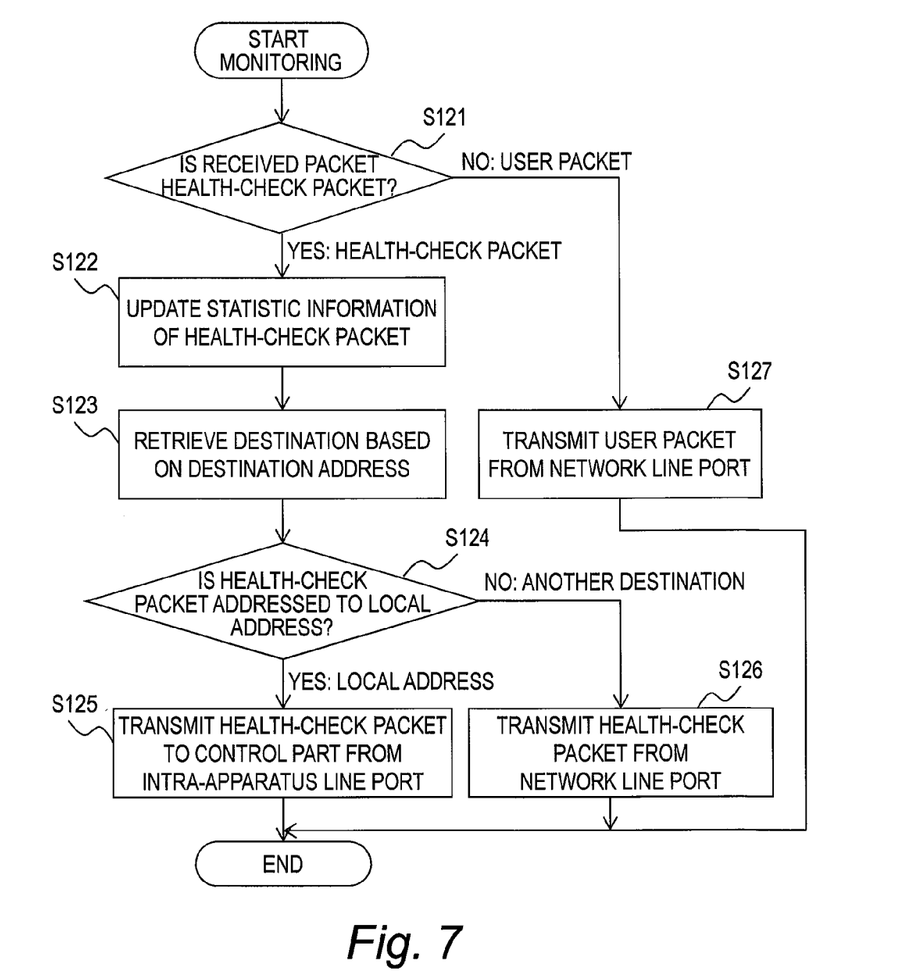
FIG. 7 is a flowchart of process for a health-check packet executed in the network processor according to the second embodiment.

FIG. 7 is a flowchart of process for a health-check packet executed in the network processor according to the second embodiment.

The processor core 122 determines whether or not the received packet is a health-check packet (Step S121). In case where the received packet is a health-check packet, the processor core 122 updates statistic information (count value) stored in the statistic counter 121 (Step S122). Specifically, the processor core 122 updates the number of health-check packets processed for each processor core.

It should be noted that the processor core 122 may not update the statistic counter 121 when receiving a packet, but may update the statistic counter 121 when completing processing of a packet.

Then, the destination retrieval part 123 determines the destination of the received health-check packet by referring to the destination address 301 (Step S123).

In case where the retrieved destination is the local apparatus (Yes in Step S124), the processor core 122 transmits the health-check packet from the intra-apparatus line port 127 (Step S125).

It should be noted that, in case where the received health-check packet has been transmitted from the local apparatus (control part 100), the type of the health-check packet corresponds to type 0, and hence the control part 100 need not generate a health-check packet to be returned. In case where the received health-check packet has been transmitted from another packet transfer apparatus, the type of the health-check packet corresponds to type 2, and hence the control part 100 generates a health-check packet (the destination address and the transmission source address being reversed) to be returned to the another packet transfer apparatus.

In case where the retrieved destination is another network apparatus (No in Step S124), on the other hand, the type of the health-check packet corresponds to type 1 or type 3, and hence the processor core 122 transmits the received health-check packet from the network line port 150 corresponding to the another network apparatus (Step S126).

In case where it is determined in Step S121 that the received packet is not a health-check packet (in case where the received packet is a user packet), on the other hand, the processor core 122 transmits the user packet from the network line port 150 corresponding to the destination of the user packet (Step S127).

The processor core 122 processes health-check packets to be transmitted at predetermined time intervals in the above-mentioned manner.

The failure detection/determination process according to the second embodiment may use the above-mentioned failure detection/determination process illustrated in FIG. 5 according to the first embodiment. According to the second embodiment, the following modification of the failure detection/determination process may be used. The modification of the failure detection/determination process according to the second embodiment differs from the above-mentioned failure detection/determination process according to the first embodiment in the processes of Steps S111 to S113.

It should be noted that, although the failure detection/determination process according to the first embodiment can be applied to the case where a single network apparatus performs alive monitoring of the processor cores of the local apparatus according to the second embodiment as illustrated in FIG. 8, the failure detection/determination process according to the first embodiment cannot be applied to the case where the single network apparatus performs alive monitoring of the processor cores of another network apparatus over a network as illustrated in FIG. 9. The failure detection/determination process according to the following modification described below may be applied to the case where the single network apparatus performs alive monitoring of the processor cores of another network apparatus over a network.

The modification of the failure detection/determination process according to the second embodiment is described referring to FIG. 5.

First, the intra-NP core monitoring program 1022 determines a failure in each processor core (Step S111). Specifically, the intra-NP core monitoring program 1022 determines whether or not each processor core has returned a health-check packet (Step S112). As the result of the determination, the processor core that has returned the health-check packet is determined not to be faulty, the intra-NP core monitoring program 1022 returns to Step S111. in case where the health-check packet is not returned even after passage of a predetermined time period, on the other hand, the intra-NP core monitoring program 1022 determines that this processor core has a failure, and proceeds to Step S113.

In Step S113, it is determined whether or not a third failure is detected within a predetermined time period. In case where the health-check packet has not been returned three times consecutively, the intra-NP core monitoring program 1022 proceeds to Step S115 and activates the partial recovery/fall-back program 1023 to execute a partial fall-back process. In case where the number of consecutive events that the health-check packet has not been returned has not reached three, on the other hand, the intra-NP core monitoring program 1022 proceeds to Step S114 and activates the partial recovery/fall-back program 1023 to execute a partial recovery process.

In other words, according to the modification of the failure detection/determination process according to the second embodiment, the control part 100 determines whether or not a health-check packet is returned from a processor core three times consecutively, and in case where a health-check packet is not returned from a processor core three times consecutively (a health-check packet is not returned in a predetermined time period (4T)), the control part 100 determines that there is a failure in the processor core, and stops this processor core. In case where a health-check packet is returned from the processor core at least once within the predetermined time period (4T), on the other hand, the control part 100 determines that this processor core is normal, and reactivates the processor core.

FIG. 8 is a diagram illustrating the health check of the network apparatus 1 according to the second embodiment.

The control part 100 (health-check packet transmission/reception program 1021) generates a health-check packet whose destination address is the local apparatus, and transmits the generated health-check packet to the network processor 120 through the intra-apparatus line ports 106 and 127.

Because the destination address 301 of the health-check packet is the MAC address of the local apparatus, the destination retrieval part 123 of the network processor 120 determines that this health-check packet is to be returned to the control part 100. The processor core 122 then transmits the health-check packet to the control part 100.

When receiving the returned health-check packet, the control part 100 (intra-NP core monitoring program 1022) performs alive monitoring of the processor core 122.

FIG. 9 is a diagram illustrating the health check in a network including the network apparatus according to the second embodiment.

A network apparatus #1 (11), a network apparatus #2 (12), and a network apparatus #3 (13) are coupled to one another, and transfer user packets.

In alive monitoring of the processor cores, the network apparatus #1 (11) serves as a master apparatus to generate a health-check packet and transmit the health-check packet to a target apparatus. The network apparatus #2 (12) serves as a transit apparatus to transfer the health-check packet transmitted from the network apparatus #1 (11) to the target apparatus.

The network apparatus #3 (13) serves as the target apparatus to process the health-check packet transmitted from the network apparatus #1 (11).

Specifically, because the destination address 301 of the health-check packet is another network apparatus, the network processor 120 of the network apparatus #1 (11) as the master apparatus outputs the health-check packet from the network line port 150. Because the destination address 301 of the health-check packet is another network apparatus, the network processor 120 of the next network apparatus #2 (12) as the transit apparatus outputs the health-check packet from the network line port 150.

Because the destination address 301 of the health-check packet is the local apparatus, the network processor 120 of the next network apparatus #3 (13) as the target apparatus transfers the health-check packet to the control part 100. The control part 100 of the network apparatus #3 (13) generates a health-check packet whose destination address and transmission source address are reversed from those of the received health-check packet, and transmits the health-check packet to the network processor 120. Because the destination address 301 of the health-check packet to be returned is another network apparatus, the network processor 120 outputs the health-check packet from the network line port 150.

It should be noted that the network processor 120, instead of the control part 100, may generate a health-check packet to be returned.

Because the destination address 301 of the health-check packet is another network apparatus, the network processor 120 of the next network apparatus #2 (12) as the transit apparatus outputs the health-check packet from the network line port 150. Because the destination address 301 of the health-check packet is the local apparatus, the network processor 120 of the next network apparatus #1 (11) as the master apparatus transfers the health-check packet to the control part 100. The control part 100 of the network apparatus #1 (11) performs alive monitoring of the processor core 122 of the network apparatus #3 (13) based on the returned health-check packet.

It should be noted that the first embodiment may be applied to the network apparatus #1 (11) as a master apparatus and the network apparatus #2 (12) as a transit apparatus so that alive monitoring of the processor core 122 is enabled by the master apparatus or by acquisition of the count value of the statistic counter 121 by the master apparatus.

According to the second embodiment of this invention, as described above, the control part 100 monitors the status of each processor core based on a health-check packet returned from each processor core, and hence a failure in each processor core can be detected reliably.

Because the control part 100 generates a health-check packet specifying a processor core to be monitored, the health-check packet can be assigned to every processor core reliably. Further, the network processor 120 stores a health-check packet in a highest priority queue, and assigns the health-check packet to each processor core, and hence discarding a health-check packet can be prevented.

Further, the control part 100 transfers a health-check packet to be transmitted to another network apparatus to the another network apparatus, and monitors the statuses of the processor cores of the another network apparatus based on the health-check packet returned from each processor core, and hence the another network apparatus can be monitored over a network. Accordingly, a failure in any processor core of the another network apparatus can be detected.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (a Solid State Drive), or a storage medium such as an IC card, or an SD card. The drawings shows control lines and information lines as considered necessary for explanation but do not show all control lines or information lines in the products. It can be considered that almost of all components are actually interconnected.

What is claimed is:

1. A network apparatus for transferring a packet, comprising:
    a control unit; and
    a network processor including a plurality of processor cores, each configured to perform a process of transferring a packet input over a network,
    the control unit being configured to:
    transmit a packet to the network processor;
    acquire a packet processing status of each of the plurality of processor cores; and
    monitor a status of the each of the plurality of processor cores based on the acquired packet processing status.

2. The network apparatus according to claim 1, wherein the network processor stores the packet transmitted from the control unit in a predetermined queue.

3. The network apparatus according to claim 2, wherein the control unit is further configured to:
    transmit a health-check packet to the network processor;
    acquire statistic information on a process for the health-check packet performed by the each of the plurality of processor cores; and
    monitor the status of the each of the plurality of processor cores based on the acquired statistic information.

4. The network apparatus according to claim 3, wherein the network processor stores the health-check packet in a lowest priority queue, and performs burst transmission of health-check packets stored in the lowest priority queue to the each of the plurality of processor cores.

5. The network apparatus according to claim 3, wherein the network processor updates statistic information on the received health-check packet, and discards the received health-check packet.

6. The network apparatus according to claim 2, wherein:
    the control unit transmits a health-check packet to the network processor;
    the each of the plurality of processor cores generates a packet to be returned to the control unit; and
    the control unit is further configured to:
    monitor the packet returned from the each of the plurality of processor cores; and
    monitor the status of the each of the plurality of processor cores based on a return status of the packet.

7. The network apparatus according to claim 6, wherein the network processor stores the health-check packet in a highest priority queue, and transmits the health-check packet stored in the highest priority queue to a processor core specified for each health-check packet.

8. The network apparatus according to claim 7, wherein:
the control unit generates a health-check packet to be transmitted to another network apparatus; and
the network apparatus is configured to:
generate a return packet in response to a received health-check packet in case where a destination of the received health-check packet is a local network apparatus; and
transmit the generated return packet to a network apparatus that has transmitted the received health-check packet.

9. A method of monitoring a processor in a network apparatus for transferring a packet,
the network apparatus including
a control unit and
a network processor including a plurality of processor cores, each configured to perform a process of transferring a packet input over a network,
the method comprising steps of:
transmitting, by the control unit, a health-check packet to the network processor;
acquiring, by the control unit, a health-check packet processing status of each of the plurality of processor cores; and
monitoring, by the control unit, a status of the each of the plurality of processor cores based on the acquired health-check packet processing status.

* * * * *